United States Patent [19]

Schmitz

[11] 4,060,923
[45] Dec. 6, 1977

[54] MINNOW DIPPER

[76] Inventor: Louis S. Schmitz, Rte. No. 1, Hankinson, N. Dak. 58041

[21] Appl. No.: 731,567

[22] Filed: Oct. 12, 1976

[51] Int. Cl.² ........................................... A01K 97/00
[52] U.S. Cl. ........................................................ 43/4
[58] Field of Search .............................................. 43/4

[56] References Cited

U.S. PATENT DOCUMENTS

| D. 168,600 | 1/1953 | Seeber | 43/4 X |
| 2,480,924 | 9/1949 | Heger | 43/4 |
| 2,611,982 | 9/1952 | Sears | 43/4 |
| 2,670,557 | 3/1954 | Pachner | 43/4 |
| 3,753,308 | 8/1973 | Swanson | 43/4 |
| 3,803,743 | 4/1974 | Nalepka | 43/4 |

Primary Examiner—Russell R. Kinsey
Assistant Examiner—Daniel J. Leach
Attorney, Agent, or Firm—Clarence A. O'Brien; Harvey B. Jacobson

[57] ABSTRACT

A handled dipper is provided including a body defining an upwardly opening receptacle having a bottom provided with drain passages therethrough. The bottom includes adjacent relatively and oppositely inclined bottom sections defining an upwardly opening included angle of between 90° and 180°. A hold-down member including opposite marginal edge portions is provided and one of the marginal edge portions of the hold-down member is pivotally supported from the marginal edge of one of the bottom sections remote from the other bottom section for swinging of the hold-down member about an axis generally paralleling the hinged marginal edge portion of the hold-down member between an active position with the hold-down member closely overlying the upper surfaces of the aforementioned one bottom section and an inactive position with the marginal edge portion of the hold-down member remote from the pivoted edge thereof elevated above the bottom.

9 Claims, 4 Drawing Figures

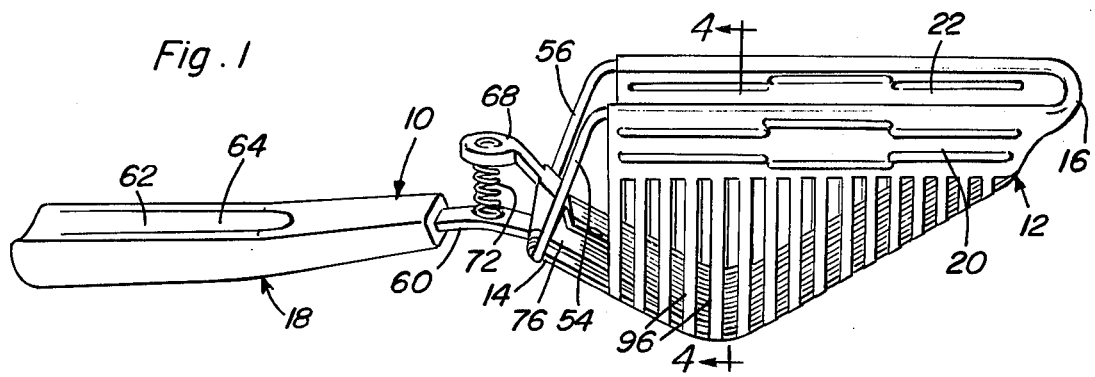
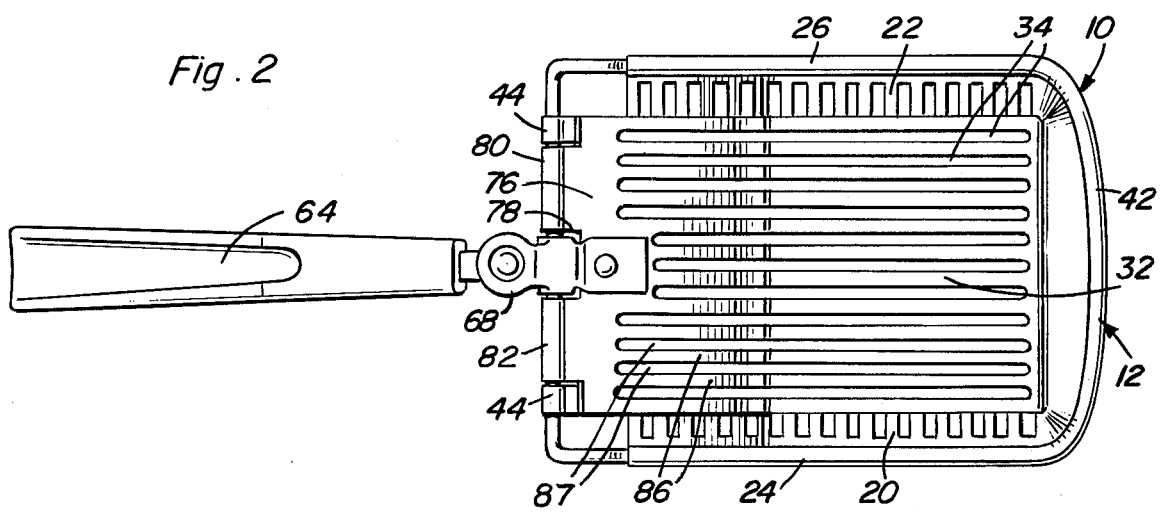
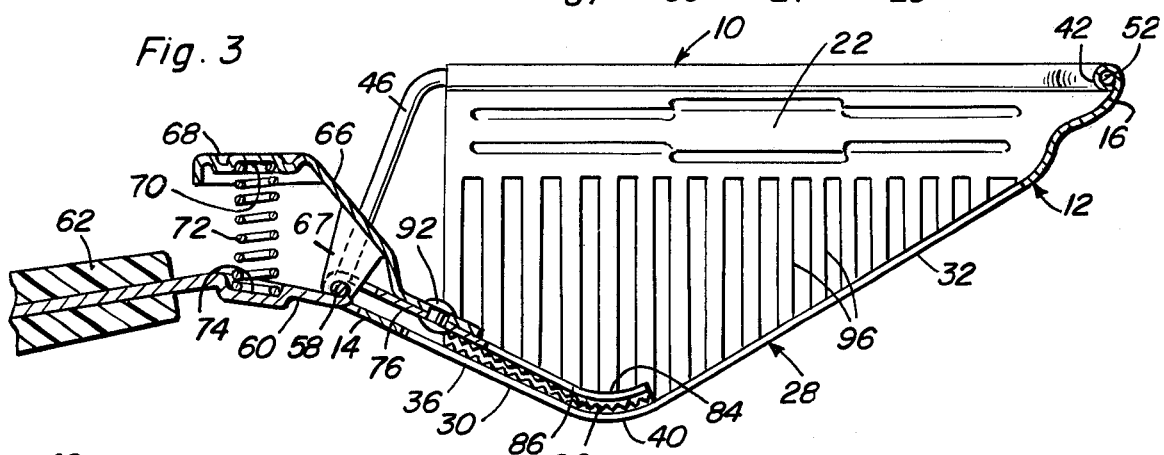
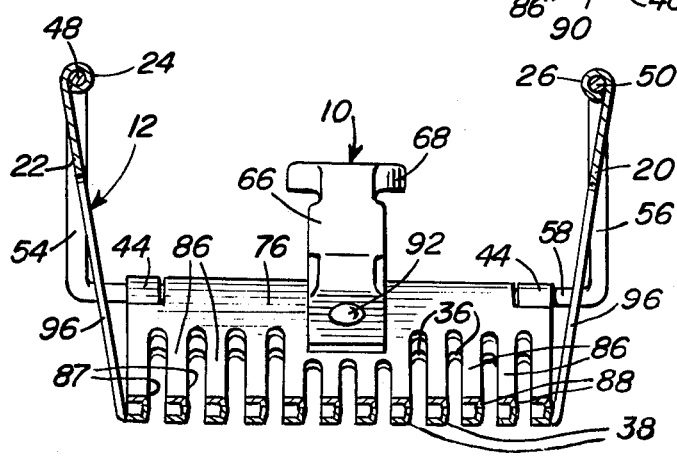

MINNOW DIPPER

BACKGROUND OF THE INVENTION

Various forms of minnow dippers designed for use in bait shops and for removing minnows from minnow buckets have been heretofore provided. However, most minnow dippers do not provide structure for gripping and maintaining a caught minnow stationary so that the minnow may be grasped or transferred from one tank to another without fear of the minnow jumping from the dipper. Still further, when a minnow dipper is utilized to remove a minnow from a minnow bucket, the minnow will often jump from the dipper as the fisherman reaches to grasp the minnow in order that it may be applied to a fishhook. Accordingly, a need exists for a minnow bucket whereby a minnow may be caught within a minnow receptacle full of water and maintained immobile either for transfer to another minnow receptacle or while being applied to a fishhook.

Examples of various forms of minnow dippers and similar devices including some of the general structural and operational features of the instant invention are disclosed in U.S. Pat. Nos. 2,480,924, 2,611,982, 3,059,369, 3,753,308 and 3,803,743.

BRIEF DESCRIPTION OF THE INVENTION

The minnow dipper of the instant invention is constructed in a manner whereby a single minnow may be readily dipped from a minnow tank or minnow bucket and maintained immobile in the dipper throughout transfer of the minnow to another minnow tank or while the minnow is being applied to a fishhook. The dipper is of such construction as to be readily handled by inexperienced persons and also in a manner which will allow a minnow to be caught without injurying the minnow.

The main object of this invention is to provide a minnow dipper which may be utilized to dip minnows from a minnow tank or minnow bucket and to retain the dipped minnows immobilized during their transfer to another minnow tank or while being applied to a fishhook.

Another object of this invention is to provide a minnow dipper constructed in a manner so as to be readily utilized to remove minnows from various different forms of minnow tanks and buckets.

Another important object of this invention is to provide a minnow dipper which may be readily efficiently handled by inexperienced persons.

A further object of this invention is to provide a minnow dipper which will greatly facilitate the application of bait minnows to fishhooks.

A final object of this invention to be specifically enumerated herein is to provide a minnow dipper in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE FIGURES

FIG. 1 is a perspective view of the minnow dipper of the instant invention;

FIG. 2 is a top plan view of the minnow dipper;

FIG. 3 is a fragmentary enlarged longitudinal vertical sectional view taken substantially upon a plane passing along the longitudinal center line of the dipper construction; and FIG. 4 is an enlarged transverse vertical sectional view taken substantially upon the plane indicated by the section line 4—4 of FIG. 1.

DETAILED DESCRIPTION OF THE INVENTION

Referring now more specifically to the drawings the numeral 10 generally designates the dipper of the instant invention. The dipper 10 includes a receptacle-defining body referred to in general by the reference numeral 12 having first and second ends 14 and 16. A handle structure referred to in general by the reference numeral 18 is supported from the first end 14 of the body 12 and projects horizontally outwardly therefrom.

The body 12 includes a pair of upstanding and slightly downwardly divergent opposite longitudinal sides 20 and 22. The upper marginal edges of the sides 20 and 22 are rolled inwardly as at 24 and 26 to define sleeve portions and the body 12 further includes a bottom construction referred to in general by the reference numeral 28 including first and second bottom sections 30 and 32. The bottom section 32 is upwardly inclined toward the forward second end 16 of the body 12 and is provided with longitudinal slots 34 defining drain openings through the bottom section 32. The bottom section 30 inclines upwardly and rearwardly toward the first end 14 of the body 12 and the section 30 includes slots 36 corresponding to the slots 32, but which are defined by upwardly struck toothed portions 38 of the bottom section 30. The adjacent portions of the sections 30 and 32 curve smoothly into each other as at 40 and the upwardly opening included angle defined between the bottom sections 30 and 32 is between 90° and 180°, but preferably generally 120°.

The upper marginal portion of the bottom section 32 remote from the section 30 is also rolled inwardly as at 42 and the upper rear marginal edge of the bottom section 30 includes a central notch defining opposite end portions 44 which are rolled outwardly and downwardly.

A heavy gauge wire frame 46 includes generally parallel leg portions 48 and 50 received through the rolled portions 24 and 26, a transverse portion 52 extending between the forward ends of the legs 48 and 50 and received through the rolled portion 42, a pair of downwardly directed rear end portions 54 and 56 and a second transverse portion 58 extending between the lower ends of the portions 56 and received through the rolled portions 44.

The central portion of the transverse portion 58 has the forward end of the shank 60 of the handle 18 secured thereto and a handgrip 62 including an upwardly opening longitudinal groove 64 is telescoped over and mounted on the rear end of the shank 60.

A lever 66 includes depending, laterally spaced and apertured mounting ears 67 oscillatably mounted on the central portion of the transverse portion 58 of the frame 46 on opposite sides of the forward end of the shank 60 and the rear end of the lever 66 is laterally enlarged as at 68 and defines a downwardly opening socket 70 in which the upper end of a compression spring 72 is seated, the lower end of the compression spring 72 being seated in an upwardly opening socket 74 formed in the shank 60 intermediate the handgrip 62 and the transverse portion 58 of the frame 46.

A generally panel-like hold-down member 76 is provided and overlies the section 30 of the bottom construction 28. The rear marginal edge of the hold-down is notched as at 78 and rolled downwardly as at 80 and 82 on opposite sides of the notch 78 and rotatably mounted on those portions of the transverse member 58 of the frame 46 disposed immediately on opposite sides of the shank 60. Accordingly, the hold-down member is hingedly supported from the transverse member 58. The marginal edge of the hold-down member 76 remote from the rolled down portions 80 and 82 is slightly upwardly curved as at 84 to conform to the curved portion 40 of the bottom construction 28 and the hold-down member 76 defines a plurality of laterally spaced fingers 86, and slots 87 therebetween, extending outwardly from the marginal edge portion thereof hingedly supported from the transverse member 58. Corresponding side marginal edges of the fingers 86 include downturned flanges 88 which are toothed as at 90 to oppose the teeth 38, the slots 87 being registered with the slots 34 and 36.

Additionally, the end of the lever 66 remote from the laterally enlarged end 68 thereof is secured to the hold-down member 76 as at 92 whereby the laterally enlarged end 68 of the lever 66 may be pushed downwardly against the biasing action of the spring 72 in order to cause the free ends of the fingers 86 of the hold-down 76 to swing upwardly away from the bottom construction 28. The upper portions of the sides 22 and 24 are imperforate and the lower portions of the sides 22 and 24 have longitudinally spaced upstanding slots 96 formed therein similar to the slots 34.

In operation, the dipper 10 is gripped by the handgrip 62 with the user's thumb engaged with the laterally enlarged portion 68. Downward pressure may be applied to the lever 66 in order to swing the hold-down 76 upwardly away from the bottom construction 28. Then, the body 12 of the dipper 10 is dipped down into a minnow bucket in order to trap a minnow in the forward portion of the bottom 12 above the bottom section 32 thereof. Thereafter, the dipper 10 is lifted from the minnow bucket and pivoted to a generally horizontal position whereby the caught minnow will slide downwardly along the bottom section 32 and come to rest above the curved portion 40 after which the thumb pressure on the laterally enlarged portion 68 may be released in order that the spring 72 may swing the free end of the hold-down 76 downwardly toward the curved portion 40 of the bottom construction 28 in order to clamp the caught minnow between the curved bottom portion 40 and the curved portion 84 of the hold-down 76. Then, a hook upon which the minnow is to be placed is inserted downwardly into the upwardly opening body 12 and downwardly through one pair of the slots 36 and 87 in registry with the portion of the minnow to be impaled by the barbed end of the hook. Thereafter, the hook is elevated in order to pass the barbed portion thereof through the desired portion of the minnow while the minnow is held immobile. As soon as the hook has been properly engaged with the minnow downward pressure may again be applied to the laterally enlarged portion 68 in order to swing the free marginal edge portion of the hold-down 76 upwardly to release the hooked minnow.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A dipper construction including a body defining an upwardly opening receptacle having a bottom defining drain passages therethrough, said bottom including adjacent relatively and oppositely inclined bottom sections defining an upwardly opening included angle of between 90° and 180°, a hold-down member including opposite marginal edge portions, one of said marginal edge portions being pivotally supported from the marginal edge of one of said sections remote from the other section for swinging about an axis generally paralleling said one marginal edge portion and said marginal edge between an active position with said hold-down closely overlying the upper surfaces of said one section and an inactive position with the other of said opposite marginal edge portions elevated above said bottom.

2. The combination of claim 1 wherein said hold-down member includes a plurality of spaced fingers extending outwardly from and spaced along said one marginal edge portion, the free ends of said fingers defining said other of said opposite marginal edge portions.

3. The combination of claim 2 wherein said fingers include downwardly facing teeth spaced longitudinally therealong.

4. The combination of claim 1 wherein said included angle is generally 120°.

5. The combination of claim 1 wherein said body includes an elongated handle supported from and projecting generally horizontally outwardly of the marginal edge of said one section remote from said other section.

6. The combination of claim 5 including a first class lever pivotally supported from said body for oscillation about said axis and having one end anchored to said hold-down member and the other end spaced above and extending along the base end of said handle.

7. The combination of claim 6 wherein said hold-down member includes a plurality of spaced fingers extending outwardly from and spaced along said one marginal edge portion, the free ends of said fingers defining said other of said opposite marginal edge portions.

8. The combination of claim 7 wherein said fingers include downwardly facing teeth spaced longitudinally therealong.

9. The combination of claim 8 wherein said included angle is generally 120°.

* * * * *